Figure 1:
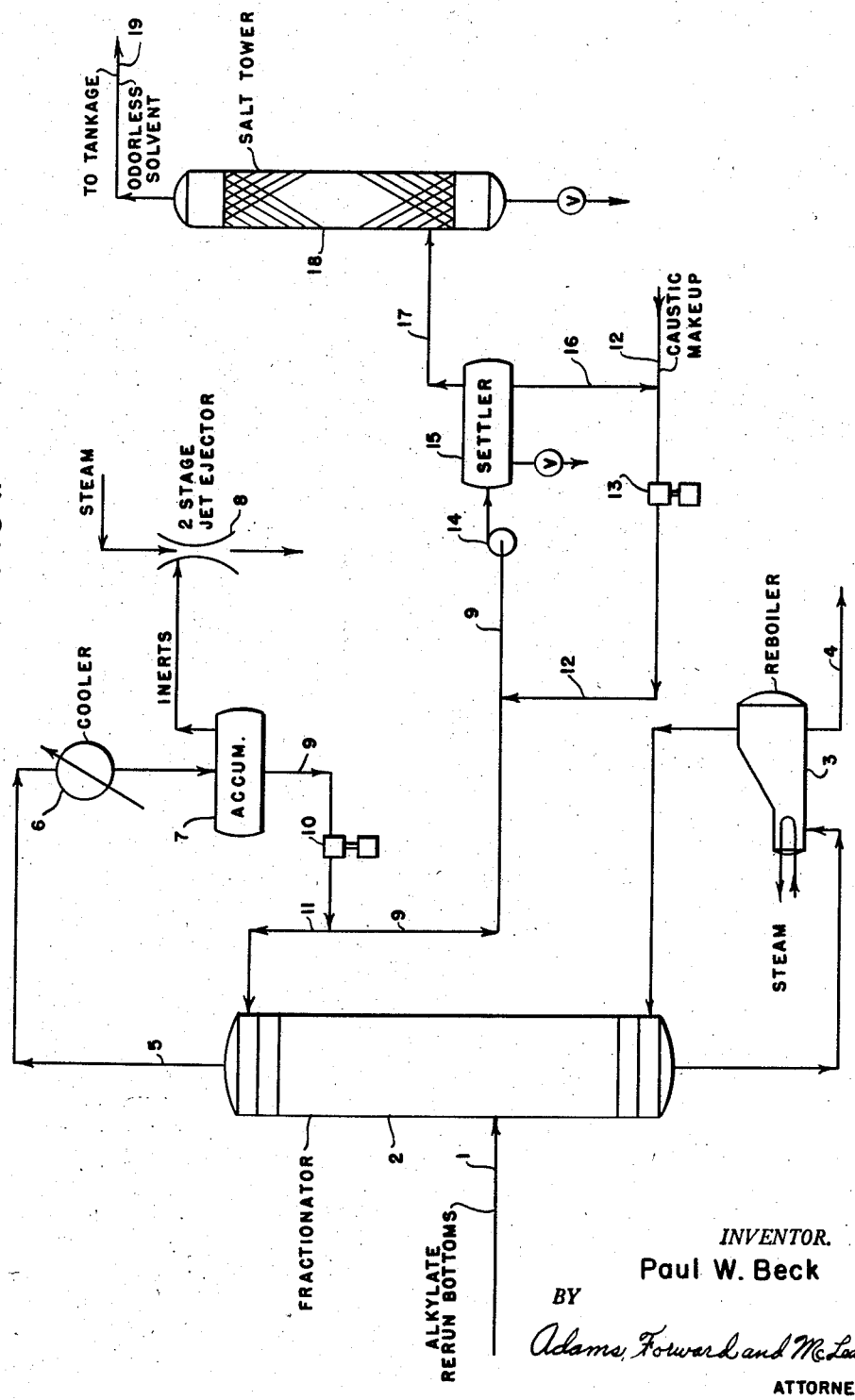

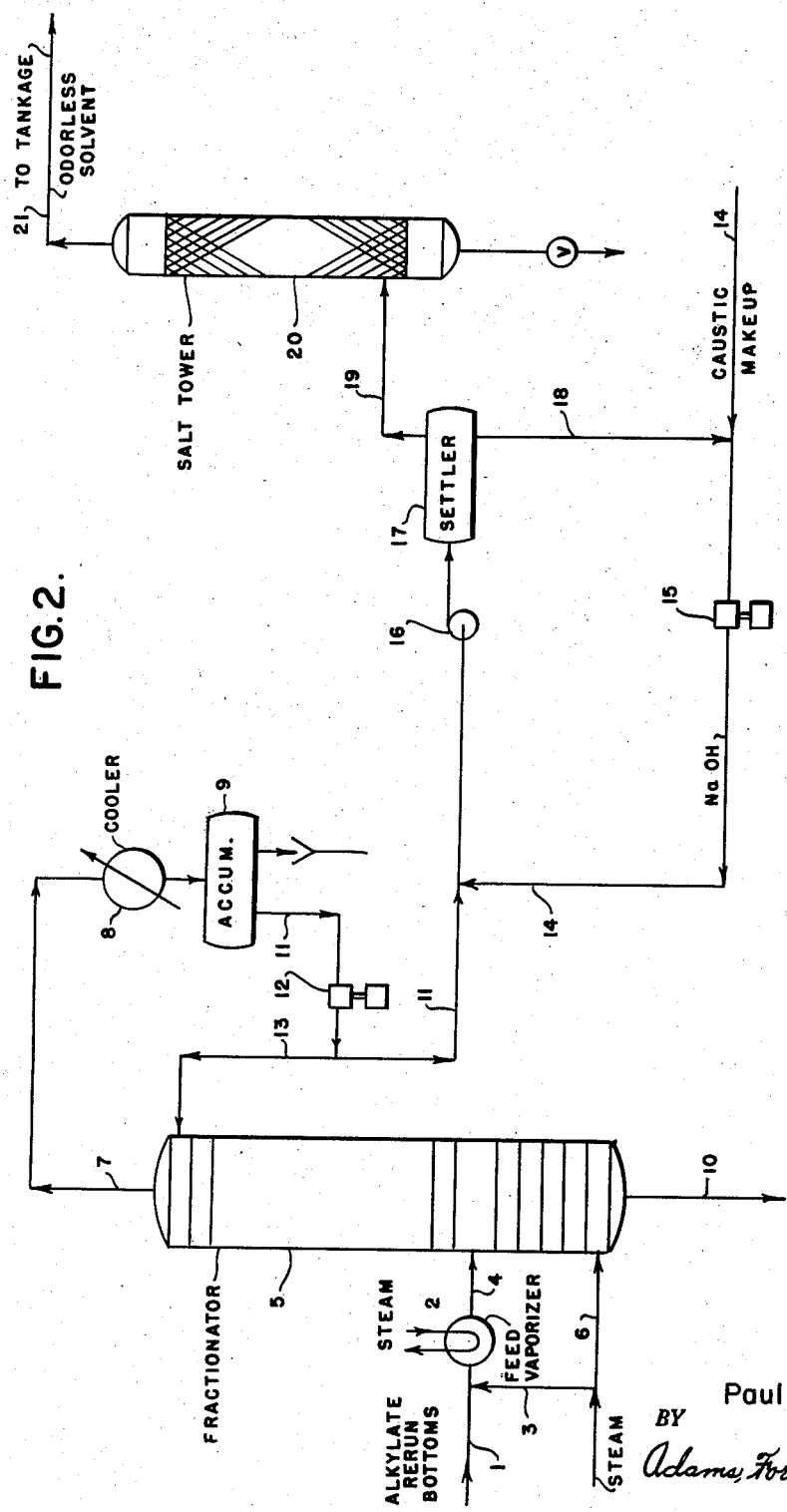

2,883,338
PROCESS FOR PRODUCING ODORLESS HYDROCARBON SOLVENT FROM HEAVY ALKYLATE

Paul W. Beck, Park Forest, Ill., assignor to Sinclair Refining Company, New York, N.Y., a corporation of Maine Application November 27, 1951, Serial No. 258,427

1 Claim. (Cl. 208—285)

My invention relates to the production of odorless paraffinic type hydrocarbon solvents from commercial alkylate bottoms.

Petroleum solvents are derived from selected fractions of the lighter constituents of crude oil which are refined and fractionated into useable boiling ranges. Paraffinic fractions known as "mineral spirits" have a wide variety of industrial applications, particularly in the paint and varnish industry. Petroleum solvents, however, are generally characterized by an odor associated with various sulfur-, nitrogen- and oxygen-containing constituents of petroleum which may be highly objectionable when used in the protective coating, dry cleaning and insecticide industries. So-called "odorless" solvents may be produced by treating straight run naphtha with sulfuric acid. Although a solvent of less odor than ordinary solvents is produced, this is not a true odorless solvent. It commands, however, a premium price when sold as a solvent for interior paint. A more accurately described "odorless" solvent may be produced from alkylate rerun bottoms, that is, the bottoms remaining as a by-product from re-running the well-known alkylate produced as an aviation gasoline blending stock. By reason of the comparatively pure hydrocarbon components used in alkylation, the product is substantially free from sulfur and nitrogen compounds which commonly give petroleum products unpleasant odors. Furthermore, unlike other pure hydrocarbons such as aromatics, the paraffinic and isoparaffinic hydrocarbons of alkylate inherently have very little, if any, odor of their own.

Although so-called "odorless" solvents have been produced from alkylate bottoms by various distillation techniques, I have found that these products retain an odor which makes them difficult to sell as an odorless solvent of first quality.

I have found that when a heavy alkylate charge stock is kept from contact with air prior to and during distillation and is distilled under specific conditions of reduced hydrocarbon partial pressure followed by a mild treatment with aqueous caustic, that the product has a markedly improved odor compared to the product obtained by atmospheric distillation or by distillation permitting the alkylate to be in contact with air. The distillation may be conducted under a vacuum or with a reduced hydrocarbon partial pressure effected by the use of steam at atmospheric pressure.

According to the process of my invention, I carefully protect the alkylate charge stock from contact with air either by processing the alkylate directly from the alkylation tower or by storage with a protective covering of an inert gas. It appears that when exposed to air the alkylate absorbs oxygen which on heating is converted to an odorous material that is carried out in the overhead solvent fraction. I distill the oxygen-free alkylate charge stock at a maximum temperature of about 415° F. and take about 70 percent of the feed overhead. This overhead fraction is then contacted wtih dilute aqueous caustic e.g. 25° Bé. caustic soda. The solvent product may be finished by contact with solid salt or other absorbent material to remove moisture.

The distillation may be carried out under vacuum or at atmospheric pressure with the use of low pressure steam. In the vacuum operation, the alkylate is distilled at a pressure of about 20–80 mm. of Hg. In the atmospheric pressure operation, low pressure steam, e.g. at a pressure of about 15 lbs. per square inch, is introduced into the distilling zone with the feed and the mixture is distilled at atmospheric pressure. Enough steam is used to obtain the desired overhead fraction without exceeding the maximum temperature. The alkylate feed is vaporized in a heated vaporizing zone before being introduced to the distilling zone. A small amount of steam is introduced into the vaporizing zone to effect complete vaporization. The petroleum fractions obtained under these processing conditions are free of objectionable odors and superior to commercial products now being successfully marketed.

The process of my invention provides an effective and economical method of obtaining odorless solvents of various boiling ranges derivable from commercially available alkylate bottoms. For example, a solvent of 300 to 400° F. boiling range is produced by topping off the treated alkylate to about 400° F. end point which has particular value as a solvent in paint vehicles and thinners for inside use. By topping off the treated alkylate to about 500° F. end point an odorless solvent of value as an insecticidal base is produced.

The process of my invention will be further illustrated by reference to the accompanying drawings of which Figure 1 is a flow diagram illustrating a method of vacuum distillation while Figure 2 is a flow diagram illustrating a method of atmospheric pressure distillation with steam.

In the operation of Figure 1, a heavy alkylate charge stock (alkylate rerun bottoms) that has been carefully excluded from contact with air is charged as through line 1 to a fractionator 2 at a temperature of about 390° F. The alkylate is heated in reboiler 3 by high pressure steam to about 400° F. Bottoms are removed from the reboiler through line 4 to tankage. About 70 percent of the feed is taken overhead from fractionator 2 through line 5 and passed to a cooler 6 and to an accumulator 7. A two stage jet ejector 8 maintains a pressure of about 20 to 80 mm. Hg in the accumulator 7. The cooled overhead fraction is then pumped through line 9 by pump 10 to a caustic washing zone. Part of the cooled overhead fraction may be returned to the fractionator 2 as reflux through line 11 as desired. An aqueous solution of 25° Bé. caustic soda is introduced through line 12 and pumped by pump 13 to line 9 where it is contacted with the overhead fraction. The caustic treated overhead fraction is pumped by pump 14 to settler 15 where caustic bottoms are returned to the caustic wash solution through line 16, the treated overhead fraction being taken overhead through line 17 to a salt tower 18 where it is contacted with salt to remove moisture. The finished odorless solvent is then removed overhead through line 19 to tankage.

In the operation of Figure 2, a heavy alkylate charge stock (alkylate rerun bottoms) that has been carefully excluded from contact with air is charged as through line 1 to a feed vaporizer 2 where it is heated by steam to a temperature of about 415° F. A small amount of low pressure steam is added to the alkylate charge stock through line 3 to effect complete vaporization of the feed. The vaporized alkylate feed is charged from the vaporizer 2 through line 4 to fractionator 5. Low pressure steam is introduced into the bottom of the fractionator 5 through line 6 and the alkylate feed is distilled at atmospheric pressure. About 70 percent of the alkylate feed is taken overhead from fractionator 5 through line 7 and passed to a cooler 8 and to an accumulator 9. The bottoms from the fractionator 5 are removed through line 10 to tankage. The cooled overhead fraction is pumped from accumulator 9 through line 11 by pump 12 to a caustic washing zone. Part of the cooled overhead fraction may be returned to the fractionator 5 as reflux through line 13 as desired. An aqueous solution of 25° Bé. caustic soda is introduced through line 14 and pumped by pump 15 to line 11 where it is contacted with the overhead fraction. The caustic treated overhead fraction is pumped by pump 16 to a settler 17 where caustic bottoms are returned to the caustic wash solution through line 18, the treated overhead fraction being taken overhead through line 19 to a salt tower 20 where it is contacted with salt to remove moisture. The finished odorless solvent is removed overhead through line 21 to tankage.

The following examples demonstrate the effectiveness of my process in producing odorless petroleum solvents.

Example I

Two samples of a heavy alkylate were used. One sample was taken and stored under a nitrogen atmosphere ("nitrogen sample") and the other sample was taken without special precaution as to contact with oxygen ("oxygen sample"). Three methods of fractionation were used:

(1) Atmospheric distillation to 70% overhead
(2) Vacuum distillation to 70% overhead
(3) Steam distillation to 70% overhead.

The vacuum and steam distillation of the "nitrogen" samples resulted in products with markedly improved odors compared to that obtained from atmospheric distillation. A further improvement in odor resulted from a 20 percent caustic wash with 25° Bé. caustic soda.

The two heavy alkylate samples had the following characteristics:

| Type of Sample | Oxygen | Nitrogen |
| --- | --- | --- |
| Gravity | 51.8 | 52.2 |
| 100 cc. Distillation: | | |
| IBP | 362 | 366 |
| 10 | 369 | 374 |
| 30 | 374 | 379 |
| 50 | 383 | 386 |
| 70 | 399 | 401 |
| 90 | 473 | 470 |
| EP | 550 | 546 |
| KB (Toluene=100) | | 31.0 |
| Mixed Aniline Point | 77.4 | |
| Percent Sulfur | .007 | .006 |

The evaluation of the odor from the three types of fractionation of the two heavy alkylate samples were:

| Type of Sample | Nitrogen | Oxygen | Oxygen | Nitrogen | Nitrogen | Nitrogen |
| --- | --- | --- | --- | --- | --- | --- |
| Type of Fractionation and Column | Atmospheric Pressure, 18 inch Hyper Cal. | Vacuum (20 mm.), 18 inch Hyper Cal. | Steam, Modified Claissen. | Vacuum (20 mm.), 18 inch Hyper Cal. | Vacuum (20 mm.), 18 inch Hyper Cal. | Steam, Modified Claissen. |
| Odor | bad | bad | bad | good | good | good. |

Example II

Larger samples of heavy alkylate were taken by the method of Example I and were processed by vacuum and steam distillation followed by the caustic treatment of Example I. Inspection tests of the resulting solvents, including an evaluation of their odor, compared to a commercial odorless mineral spirits demonstrated that superior products were obtained by steam and vacuum distillation of the "nitrogen" samples.

| Solvent | Commercial Odorless Mineral Spirits | 70% Overhead Heavy Alkylate | | | |
| --- | --- | --- | --- | --- | --- |
| Type of Distillation | | Vacuum (50 mm.) | | Steam | |
| Method of Sampling | | Oxygen | Nitrogen | Oxygen | Nitrogen |
| Inspection Tests: | | | | | |
| API Gravity | 54.2 | 54.3 | 54.5 | 53.8 | 54.3. |
| Distillation (ASTM D-86)— | | | | | |
| IBP | 359 | 357 | 356 | 359 | 358. |
| 10 | 363 | 361 | 359 | 364 | 362. |
| 30 | 364 | 363 | 361 | 367 | 365. |
| 50 | 366 | 365 | 363 | 370 | 367. |
| 70 | 368 | 367 | 364 | 374 | 371. |
| 90 | 373 | 372 | 368 | 390 | 384. |
| DP | 382 | 385 | 374 | 432 | 428. |
| EP | 394 | 389 | 382 | 440 | 135. |
| T.C.C. Flash | 133 | 133 | 133 | 133 | 27.9. |
| K.B. (Toluene=100) | 27.6 | | | | 76.5. |
| Mixed Aniline Point (°C.) | 76.6 | 76.3 | 76.6 | 76.7 | Not determined. |
| Corrosion (Distillation Flask) | Very slight peacock | Peacock | Slight peacock | Slight Tarnish | Do. |
| Sulfur (Percent) | 0.001 | 0.002 | 0.002 | 0.002 | Excellent. |
| Odor | Excellent | (Faintly kerosene like) | Excellent | (Faintly Kerosene like) | |

Example III

The finished solvents prepared as by Example II were evaluated for odor as compared to two commercial odorless solvents using commercial solvent #1 as a standard. This evaluation showed the superior product obtained by steam and vacuum distillation of the "nitrogen" samples.

| Order of Decreasing Odor | Odor |
| --- | --- |
| 1. Oxygen Sample—Steam Distillation | Stronger than Commercial Solvent #1. |
| 2. Oxygen Sample—Vacuum Distillation | Do. |
| 3. Commercial Solvent #1 | |
| 4. Commercial Solvent #2 | Slight Odor. |
| 5. Nitrogen Sample—Steam Distillation | Substantially Odorless. |
| 6. Nitrogen Sample—Vacuum Distillation | Do. |

I claim:

A process for producing an odorless petroleum hydrocarbon solvent from a heavy alkylate charge stock which comprises protecting the alkylate charge stock from contact with air, introducing the oxygen-free alkylate charge stock into a distilling zone, distilling said alkylate at a reduced hydrocarbon partial pressure obtained by maintaining a vacuum of about 20 to 80 millimeters of mercury in the distilling zone and at a maximum temperature of about 415° F. removing an overhead product and treating the overhead product with dilute aqueous caustic.

References Cited in the file of this patent

UNITED STATES PATENTS

| | | |
|---|---|---|
| 1,999,041 | Dunstan | Apr. 23, 1935 |
| 2,045,492 | Pew | June 23, 1936 |
| 2,148,056 | Burk et al. | Feb. 21, 1939 |
| 2,442,011 | Legatski | May 25, 1948 |
| 2,463,601 | Crawford et al. | Mar. 8, 1949 |
| 2,468,986 | Legatski et al. | May 3, 1949 |